United States Patent [19]

Kumada et al.

[11] Patent Number: 5,055,514

[45] Date of Patent: Oct. 8, 1991

[54] PAINT RESIN COMPOSITION

[75] Inventors: Hajime Kumada; Akio Shoji, both of Kishiwada, Japan

[73] Assignee: Dainippon Ink and Chemicals, Inc., Tokyo, Japan

[21] Appl. No.: 581,129

[22] Filed: Sep. 10, 1990

Related U.S. Application Data

[63] Continuation of Ser. No. 492,416, Mar. 6, 1990, abandoned, which is a continuation of Ser. No. 243,127, Sep. 7, 1988, abandoned, which is a continuation of Ser. No. 26,894, Mar. 17, 1987, abandoned.

[30] Foreign Application Priority Data

Mar. 17, 1986 [JP] Japan .................................. 61-57108

[51] Int. Cl.$^5$ ................................................ C08K 5/01
[52] U.S. Cl. ..................................... 524/484; 524/507; 525/127
[58] Field of Search .................... 524/507, 484; 525/127

[56] References Cited

U.S. PATENT DOCUMENTS

| | | | |
|---|---|---|---|
| 4,491,646 | 1/1985 | Gruber et al. | 525/123 |
| 4,503,175 | 3/1985 | Houze et al. | 525/123 |
| 4,532,300 | 7/1985 | Lenz et al. | 525/123 |
| 4,647,623 | 3/1987 | Kase et al. | 525/127 |

FOREIGN PATENT DOCUMENTS

| | | |
|---|---|---|
| 0103146 | 3/1984 | European Pat. Off. . |
| 0155559 | 9/1985 | European Pat. Off. . |
| 0175344 | 3/1986 | European Pat. Off. . |
| 2366330 | 4/1978 | France . |
| 7134 | 3/1944 | Japan . |
| 22011 | 7/1970 | Japan . |
| 20502 | 6/1971 | Japan . |
| 78233 | 10/1973 | Japan . |
| 47916 | 12/1974 | Japan . |
| 6223 | 3/1975 | Japan . |
| 58123 | 5/1975 | Japan . |
| 198760 | 12/1982 | Japan . |
| 198761 | 12/1982 | Japan . |
| 255861 | 12/1985 | Japan . |
| 072013 | 4/1986 | Japan . |

Primary Examiner—Ana L. Carrillo
Attorney, Agent, or Firm—Sherman and Shalloway

[57] ABSTRACT

A paint resin composition which does not appreciably attack an old coated film or a substrate to be coated, said composition consisting essentially of (A) a copolymer having a glass transition point of from $-30°$ C. to $+50°$ C., a number average molecular weight of from 4,000 to 20,000 and a weight average molecular weight/number average molecular weight ratio of from 1.8 to 10 and obtained by copolymerizing (a-1) 1 to 50% by weight of a vinyl monomer having a hydroxyl group, (a-2) 0 to 5% by weight of a vinyl monomer having a carboxyl group, (a-3) 0 to 80% by weight of a polyester resin having a copolymerizable unsaturated bond, (a-4) 10 to 80% by weight of a vinyl monomer having a side-chain alkyl group with 4 to 8 carbon atoms, and (a-5) 4 to 49% by weight of another vinyl monomer copolymerizable with the monomers (a-1) to (a-4), the total proportion of these monomers being 100% by weight, in the presence of a radical initiator in a nonpolar organic solvent having an aniline point of 7° to 70° C., (B) a polyisocyanate containing an isocyanurate ring and being soluble in a nonpolar organic solvent having an aniline point of from 7° to 70° C., said polyisocyanate being obtained by reacting a least one diisocyanate compound selected from alkylene diisocyanates having 2 to 8 carbon atoms in the alkylene moiety, cycloalkylene diisocyanates having 6 to 8 carbon atoms in the cycloalkylene moiety and aralkylene diisocyanates having 7 to 8 carbon atoms in the aralkylene moiety with a diol having 10 to 40 carbon atoms, and (C) a nonpolar organic solvent, the OH/NCO equivalent ratio of the copolymer (A) to the polyisocyanate (B) being from 1:0.2 to 1:1.5.

4 Claims, No Drawings

PAINT RESIN COMPOSITION

This application is a continuation of application Ser. No. 07/492,416 filed Mar. 6, 1990 now abandoned which is a continuation of Ser. No. 07/243,127, filed 9/7/88 now abandoned which is a continuation of Ser. No. 07/026,894, filed Mar. 17, 1987 now abandoned.

This invention relates to a paint resin composition which has superior operability and weatherability, does not appreciably attack an old coated film or a substrate to be coated by the solvent used and is very useful for automobile repair coating, exterior finish coating of buildings and for coating roofs and plastics.

Acrylic-urethane paints have been used widely in various applications because they give superior film properties. In such applications as automobile repair coating, exterior finishing coating of buildings and coating roofs and plastics, however, a film of such a urethane-type paint applied to an old coated film or a primer at the time of recoating may undergo lifting if the old coated film or the primer has inferior solvent resistance as in the case of a lacquer. When such a paint film is applied to a substrate having inferior solvent resistance such as polycarbonate or polyphenylene oxide, the substrate may undergo solvent cracking. These are great drawbacks in practical application in the paint industry, and an urgent improvement has been desired.

On the other hand, among curing agents for polyurethane resins having excellent mechanical properties, such as high abrasion resistance, and excellent chemical resistance, polyisocyanates derived from alkylene diisocyanates and cycloalkylene diisocyanates known as "non-yellowing" diisocyanates and polyisocyanates derived from aralkylene diisocyanates known as "difficultly-yellowing" diisocyanates have good weatherability and durability. Above all, polyisocyanates having an isocyanurate ring are known to have higher weatherability and durability than conventional biuret-type or adduct-type polyisocyanates because of the high chemical stability of the isocyanurate ring.

Polyisocyanates of the isocyanurate type derived from alkylene diisocyanates, cycloalkylene diisocyanates, etc. have very good properties, and are expected to have wider industrial applications. However, since the isocyanurate ring in these isocyanurate-type polyisocyanates has high polarity, it is necessary to use them as solutions in organic solvents having high dissolving power and being polar, for example ester solvents such as ethyl acetate and butyl acetate and ketone solvents such as methyl ethyl ketone and methyl isobutyl ketone. The use of such solvents causes great hazards in practical application in regard to working environments, atmospheric pollution, performance, etc.

It is an object of this invention to provide a paint resin composition which does not cause the aforesaid hazards.

As a composition which can achieve this object, the present invention provides a paint resin composition which does not appreciably attack an old coated film or a substrate to be coated, said composition consisting essentially of (A) a copolymer having a glass transition point of from $-30°$ C. to $+50°$ C., a number average molecular weight of from 4,000 to 20,000 and a weight average molecular weight/number average molecular weight ratio of from 1.8 to 10 and obtained by copolymerizing (a-1) 1 to 50% by weight of a vinyl monomer having a hydroxyl group, (a-2) 0 to 5% by weight of a vinyl monomer having a carboxyl group, (a-3) 0 to 80% by weight of a polyester resin having a copolymerizable unsaturated bond, (a-4) 10 to 80% by weight of a vinyl monomer having a side-chain alkyl group with 4 to 8 carbon atoms, and (a-5) 4 to 49% by weight of another vinyl monomer copolymerizable with the monomers (a-1) to (a-4), the total proportion of these monomers being 100% by weight, in the presence of a radical initiator in a nonpolar organic solvent having an aniline point of 7° to 70° C., (B) a polyisocyanate containing an isocyanurate ring and being soluble in a nonpolar organic solvent having an aniline point of from 7° to 70° C., said polyisocyanate being obtained by reacting at least one diisocyanate compound selected from alkylene diisocyanates having 2 to 8 carbon atoms in the alkylene moiety, cycloalkylene diisocyanates having 6 to 8 carbon atoms in the cycloalkylene moiety and aralkylene diisocyanates having 7 to 8 carbon atoms in the aralkylene moiety with a diol having 10 to 40 carbon atoms, and (C) a nonpolar organic solvent, the OH/NCO equivalent ratio of the copolymer (A) to the polyisocyanate (B) being from 1:0.2 to 1:1.5.

Typical examples of the vinyl monomer (a-1) containing a hydroxyl group which is used as one material for preparing the copolymer (A) include hydroxyl alkyl esters of alpha,beta-ethylenically unsaturated carboxylic acids such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 3-chloro-2-hydroxypropyl (meth)acrylate, di-2-hydroxyethyl fumarate, mono-2-hydroxyethyl monobutyl fumarate and polyethylene glycol mono(meth)acrylate; a variety of hydroxyl group-containing monomers such as adducts formed between unsaturated alpha,beta-ethylenically unsaturated mono- or di-carboxylic acids such as (meth)acrylic acid, crotonic acid, maleic acid, fumaric acid, itaconic acid and citraconic acid, or monoesters of these alpha,beta-ethylenically unsaturated dicarboxylic acids with monohydric alcohols, and monoglycidyl esters of monocarboxylic acids such as "Cardura E" (glycidyl ester of a branched synthetic carboxylic acid made by Shell Chemical Co. of Netherlands), a glycidyl ester of coconut oil fatty acid or glycidyl octylate, or monoepoxy compounds such as butyl glycidyl ether, ethylene oxide or propylene oxide, or adducts formed between polycarboxylic anhydride adducts such as the aforesaid hydroxyl alkyl esters of alpha,beta-ethylenically unsaturated carboxylic acids with polycarboxylic anhydride such as maleic anhydride, succinic anhydride, phthalic anhydride, hexahydrophthalic anhydride, tetrahydrophthalic anhydride, benzenetricarboxylic anhydride, benzenetetracarboxylic anhydride, tetrachlorophthalic anhydride or dodecenylsuccinic anhydride, and the aforesaid monoglycidyl esters of monocarboxylic acid or monoepoxy compounds; compounds obtained by the addition-reaction of the above hydroxyalkyl esters of alpha,beta-ethylenically unsaturated carboxylic acids with epsilon-caprolactone; compounds containing a methylol group such as N-methylolated acrylamide; and hydroxyethyl vinyl ether. These vinyl monomers may be used singly or in combination.

The vinyl monomer (a-1) is used to obtain a crosslinking site, and its suitable amount is 1 to 50% by weight, preferably 5 to 40% by weight.

Typical examples of the vinyl monomer (a-2) containing a carboxyl group include alpha,beta-ethylenically unsaturated mono-or di-carboxylic acids such as (meth)acrylic acid, crotonic acid, itaconic acid, maleic acid, fumaric acid and citraconic acid; monoesters of these dicarboxylic acids and monohydric alcohols; and adducts formed between the above hydroxyalkyl esters of alpha,beta-unsaturated carboxylic acids and the above anhydrides of polycarboxylic acids.

These monomers (a-2) may be used singly or in combination when it is desired to improve compatibility, curability and adhesion. The amount of the vinyl monomer (a-2) is 0 to 5% by weight. If it is used in an amount exceeding 5% by weight, the pot life of a mixture of the copolymer (A) and the polyisocyanate (B) is undesirably shortened. The suitable amount is preferably 0.2 to 2% by weight.

The polyester resin (a-3) having a copolymerizable unsaturated bond is used to improve operability, levelling property, appearance and pigment dispersibility and impart solubility in the nonpolar organic solvent (C). It may, or may not, be modified with oils and/or fatty acids. To improve solubility in nonpolar organic solvents further, the polyester resin (a-3) is preferably modified with an oil and/or a fatty acid. The suitable amount of the polyester resin (a-3) is 0 to 80% by weight, preferably 0.5 to 70% by weight. When the polyester resin not modified with an oil and/or a fatty acid is used, its amount is preferably not more than 20% by weight in view of solubility in the solvent (C). On the other hand, if the amount of the polyester (a-3) exceeds 80% by weight, it is impossible to obtain an effect of improving drying property, chemical resistance, hardness and weatherability, or in other words an effect of modifying the polyester resin (a-3) with the vinyl monomers (a-1), (a-2), (a-4) and (a-5).

Suitable examples of the polyester resin (a-3) containing a copolymerizable unsaturated bond are given below.

(1) Polyester resins having a copolymerizable unsaturated group in the resin skeleton obtained by reacting a raw material having a copolymerizable unsaturated group with another raw material, as is known from, for example, Japanese Patent Publications Nos. 22011/1970, 20502/1971 and 7134/1969, and Japanese Laid-Open Patent Publications Nos. 78233/1973 and 58123/1975.

(2) Polyesters obtained by addition-reaction between saturated polyesters having no copolymerizable unsaturated group with vinyl monomers having a vinyl group and a functional group capable of reacting with functional groups present in the saturated polyesters, such as a hydroxyl or carboxyl group. Examples of the vinyl monomer are vinyl monomers having an epoxy group and a vinyl group such as glycidyl (meth)acrylate, vinyl monomers having an alkoxysilanol group and a vinyl group such as vinylmethoxysilane and (meth)acryloxyethyltrimethoxysilane; vinyl monomers having an acid anhydride group and a vinyl group such as maleic anhydride and tetrahydrophthalic anhydride, and vinyl monomers having an isocyanate group and a vinyl group such as an equimolar adduct of 2-hydroxypropyl (meth)acrylate/hexamethylene diisocyanate, as is known from, for example, Japanese Patent Publications Nos. 47916/1974 and 6223/1975.

(3) Polyesters obtained by reacting at least one polyhydric alcohol such as ethylene glycol, propylene glycol, glycerol, trimethylolethane, trimethylolpropane, neopentyl glycol, 1,6-hexanediol, 1,2,6-hexanetriol, pentaerythritol and sorbitol and at least one carboxylic acid such as benzoic acid, p-t-butylbenzoic acid, phthalic acid (anhydride), hexahydrophthalic acid (anhydride), tetrahydrophthalic acid (anhydride), tetrachlorophthalic acid (anhydride), hexachlorophthalic acid (anhydride), tetrabromophthalic acid (anhydride), trimellitic acid, succinic acid (anhydride), maleic acid (anhydride), fumaric acid, itaconic acid (anhydride), adipic acid, sebacic acid and oxalic acid in a customary manner. If desired, this reaction may be carried out in the presence of one or more of a saturated fatty acid such as octylic acid, lauric acid, stearic acid and "Versatic acid" (synthetic fatty acid made by Shell Chemical Co., of Netherlands), an unsaturated fatty acid such as oleic acid, linoleic acid, linolenic acid, ereostearic acid, ricinoleic acid, a (semi)drying oil (fatty acid) such as "Pamolyn 200 or 300" (synthetic drying oil fatty acid made by Hercules Co., U.S.A.), Chinese tung oil (fatty acid), linseed oil (fatty acid), dehydrated castor oil (fatty acid), tall oil (fatty acid), cottonseed oil (fatty acid), soybean oil (fatty acid), olive oil (fatty acid), safflower oil (fatty acid), castor oil (fatty acid) and rice oil (fatty acid), or a non-drying oil (fatty acid) such as hydrogenated coconut oil fatty acid, coconut oil fatty acid or palm oil fatty acid. If further required, the above polyhydric alcohols or carboxylic acids may partly be replaced by at least one of monoepoxy compounds such as "Cardura E" (a glycidyl ester of a branched synthetic fatty acid made by Shell Chemical Co., of Netherlands), polyepoxy compounds such as "Epiclon 200 or 400" and "Epikote 828 or 1001", diisocyanates such as tolylene diisocyanate, hexamethylene diisocyanate, isophorone diisocyanate or 4,4'-methylenebis(cyclohexyl isocyanate), polyisocyanates obtained by addition reaction of such diisocyanates with the above polyhydric alcohols or water, or polyisocyanates having an isocyanurate ring obtained by (co)polymerization of the diisocyanates.

Typical examples of the vinyl monomer (a-4) having a $C_4$-$C_8$ side-chain alkyl group include esters of (meth)acrylic acid with monohydric alcohols having 4 to 8 carbon atoms, such as n-butyl (meth)acrylate, i-butyl (meth)acrylate, t-butyl (meth)acrylate, hexyl (meth)acrylate, acrylate, 2-ethylhexyl (meth)acrylate, pentyl (meth)acrylate, heptyl (meth)acrylate, octyl (meth)acrylate, benzyl (meth)acrylate and cyclohexyl (meth)acrylate; and diesters of unsaturated dicarboxylic acids with monohydric alcohols having 4 to 8 carbon atoms, such as dibutyl maleate, di-2-ethylhexyl maleate, dibutyl fumarate, di-2-ethylhexyl fumarate, dibutyl itaconate and di-2-ethylhexyl itaconate. The vinyl monomer (a-4) is an essential component for imparting solubility in the nonpolar organic solvent (C). The above vinyl monomers (a-4) may be used singly or in combination. If the amount of the vinyl monomer (a-4) is less than 10% by weight, the resulting copolymer has insufficient solubility in the nonpolar organic solvent (C). If it exceeds 80% by weight, the solubility of the resulting copolymer increases, but a cured paint film obtained from the resulting composition has reduced soiling resistance, solvent resistance, hardness, drying property and antiblocking property. Hence, good results are easy to obtain when its amount is 10 to 80% by weight, preferably 20 to 70% by weight.

Typical examples of the other vinyl monomer (a-5) copolymerizable with the components (a-1) to (a-4) are shown in (i) to (vii) below. Vinyl monomers other than the above vinyl monomers are selected.

(i) Aromatic vinyl monomers such as styrene, alpha-methylstyrene, p-tert-butylstyrene and vinyltoluene.

(ii) (meth)acrylates such as methyl (meth)acrylate, ethyl (meth)acrylate, n-propyl (meth)acrylate, i-propyl (meth)acrylate, lauryl (meth)acrylate, dibromopropyl (meth)acrylate, tribromophenyl (meth)acrylate and alkoxyalkyl (meth)acrylates; diesters formed between unsaturated dicarboxylic acids such as maleic acid, fumaric acid and itaconic acid and monohydric alcohols; vinyl esters such as vinyl acetate, vinyl benzoate and "Veova" (vinyl ester made by Shell Chemical Co. of Netherlands); fluorine-containing compounds, for example vinyl esters, vinyl ethers, (meth)acrylates and unsaturated polycarboxylic acid esters which have a (per)fluoroalkyl group, such as fluorine-containing acrylic monomers [e.g., 2,2,2-trifluoroethyl (meth)acrylate], (per)fluorocyclohexyl (meth)acrylate, diperfluorocyclohexyl, fumarate and N-i-propylperfluorooctanesulfonamidoethyl (meth)acrylate; and (meth)acrylonitriles; and vinyl or vinylidene halides such as vinyl chloride, vinylidene chloride, vinyl fluoride and vinylidene fluoride.

(iii) Epoxy group-containing polymerizable compounds such as glycidyl (meth)acrylate, (beta-methyl)-glycidyl (meth)acrylate or (meth)allyl glycidyl ether; and compounds obtained by addition-reaction of equimolar proportions of the aforesaid alpha,beta-ethylenically unsaturated carboxylic acids or various unsaturated carboxylic acids such as an equimolar adduct of a hydroxyl-containing vinyl monomer such as mono-2-(meth)acryloyloxymonoethyl phthalate and the above polycarboxylic acid anhydride, with polyepoxy compounds having at least two epoxy groups per molecule, such as "Epiclon 200, 400, 441, 850 or 1050" (epoxy resins made by Dainippon Ink and Chemicals, Inc.), "Epikote 828, 1001 or 1004" (epoxy resins made by Shell Chemical Co.), and "Araldite 6071 or 6084" (epoxy resins made by Ciba-Geigy of Switzerland).

(iv) Silicon-type monomers such as vinylethoxysilane and gamma-methacryloxypropyltrimethoxysilane.

(v) Vinyl monomers containing a phosphorus atom represented by the general formula

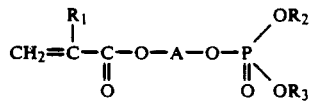

wherein $R_1$ is hydrogen or methyl, $R_2$ and $R_3$ represent hydrogen, an alkyl group having 1 to 8 carbon atoms, an aryl group, or an aralkyl group having 7 to 12 carbon atoms, and A represents an alkylene group having 1 to 14 carbon atoms,
such as 2-(meth)acryloyloxyethyl acid phosphate and dibutyl [2-(meth)acryloyloxyethyl]phosphate.

(vi) Amide group-containing vinyl monomers such as (meth)acrylamide, dimethyl(meth)acrylamide and N-t-butyl(meth)acrylamide.

(vii) Dialkylaminoalkyl (meth)acrylates such as dimethylaminoethyl (meth)acrylate and diethylaminoethyl (meth)acrylate.

The amount of the vinyl monomer (a-5) used may be determined within the range of 4 to 49% by weight by considering the balance of its amount with the amounts of the other components (a-1) to (a-4), copolymerizability, the solubility of the resulting copolymer in the nonpolar organic solvent (C) used, coating operability, gloss, flexibility, hardness, weatherability, drying property, solvent resistance, abrasion resistance, compatibility, dilutability, glass transition point, etc. The vinyl monomers (v) to (vii) exemplified above may sometimes adversely affect chemical resistance, water resistance, the viscosity of the resin, and the pot life, etc. Hence, the amount of these vinyl monomers is preferably within the range of 0.05 to 10% by weight, above all 0.1 to 5% by weight, when the balance between such adverse effects and the effect of using the monomers, such as an improvement in pigment dispersibility or adhesion. When the final paint film is required to have weatherability and yellowing resistance, the amount of the aromatic vinyl monomer used is preferably limited to not more than 40% by weight, particularly not more than 35% by weight.

The above raw materials are properly selected according to the desired properties, and copolymerized in a customary manner in the presence of one or more radical initiators such as azobisisobutyronitrile, benzoyl peroxide, t-butyl perbenzoate, t-butyl hydroperoxide, di-t-butyl peroxide and cumene hydroperoxide in a nonpolar organic solvent having an aniline point of 7° to 70° C. to obtain the copolymer (A) used in this invention.

The copolymer (A) has a glass transition point (tg) of from −30° to +50° C. when it is calculated in accordance with the Fox's equation as follows:

$$\frac{1}{Tg} = \Sigma \frac{mi}{Tgi}$$

wherein Tgi represents the Tg of the component i, and mi represents the weight fraction of the component i.

If the copolymer has a Tg of less than −30° C., a cured paint film finally obtained by using the copolymer (A) is inferior in soil resistance, solvent resistance, hardness, drying property and anti-blocking property. If the copolymer has a Tg of more than +50° C., a cured paint film obtained by using the copolymer (A) becomes hard and brittle, is liable to develop cracks, and has reduced elongation, flexural strength, impact resistance, and Erichsen.

The copolymer (A) used in the invention also has a number average molecular weight of 4000 to 20000 and a weight average molecular weight ($\overline{Mw}$)/number average molecular weight ($\overline{Mn}$) ratio of from 1.8 to 10. If the copolymer (A) has a $\overline{Mn}$ of less than 4000, the elongation, weatherability and hardness of the paint film are insufficient. On the other hand, if the copolymer has a $\overline{Mn}$ of more than 20000, film thickness, spray operability and appearance of the final paint film are deteriorated. Preferably, the $\overline{Mn}$ of the copolymer (A) is in the range of 6000 to 12000. If the $\overline{Mw}/\overline{Mn}$ ratio is less than 1.8, the resulting composition is frequently insufficient in pigment dispersibility and film properties. On the other hand, if the $\overline{Mw}/\overline{Mn}$ ratio of the copolymer exceeds 10, the resulting composition is frequently inconvenient in regard to film thickness, spray operability, appearance and pot life. Better results tend to be obtained when the $\overline{Mw}/\overline{Mn}$ ratio of the copolymer is in the range of 2 to 6.

The polyisocyanate (B) having an isocyanurate ring obtained by reacting a diisocyanate compound selected from alkylene diisocyanates having 2 to 8 carbon atoms in the alkylene moiety, cycloalkylene diisocyanates having 6 to 8 carbon atoms in the cycloalkylene moiety and aralkylene diisocyanates having 7 to 8 carbon atoms in the aralkylene moiety and a diol having 10 to 40 carbon atoms in the presence of an isocyanuration catalyst can be produced by the method disclosed in Japanese Laid-Open Patent Publication No. 72013/1986. Specifically, it is obtained by reacting at least one diisocyanate selected from $C_2$–$C_8$-alkylene-diisocyanates such as 1,4-tetramethylene diisocyanate and 1,6-hexamethylene diisocyanate, $C_6$–$C_8$-cycloalkylene-diisocyanates such as 1,3- or 1,4-diisocyanatocyclohexane and 1,3-or 1,4-bis (isocyanatomethyl)-cyclohexane and $C_7$–$C_8$-aralkylene diisocyanates such as 1,3- or 1,4-xylilene diisocyanate, with at least one diol having 10 to 40 carbon atoms, preferably 12 to 30 carbon atoms, such as 1,10-decanediol, 1,12-dodecanediol, 2-hydroxypalmityl alcohol, 2-hydroxystearyl alcohol, 12-hydroxystearyl alcohol, a dimer of oleyl alcohol, a hydrogenated dimer of oleyl alcohol, and 2,2-bis(4-hydroxycyclohexyl)propane (commonly called hydrogenated bisphenol A) in the presence of an isocyanuration catalyst.

If alkylene-, cycloalkylene- and aralkylene-diisocyanate compounds having an alkylene, cycloalkylene or aralkylene group with 9 or more carbon atoms, such as 2,2,4- or 2,4,4-trimethylhexamethylene diisocyanate, isopropylidene-bis(4-cyclohexyl isocyanate) or 3-isocyanatomethyl-3,5,5-trimethylcyclohexyl isocyanate, are used, isocyanurate ring-containing polyisocyanates derived from these compounds have a very much reduced content of isocyanate groups. This is undesirable in designing the resin and moreover economically disadvantageous in practical application. It is possible however to use these alkylene-, cycloalkylene- or aralkylene-diisocyanates having 9 or more carbon atoms in the alkylene, cycloalkylene or aralkylene group together with the diisocyanates defined in the present invention. The proportion of such diisocyanates having 9 or more carbon atoms is desirably not more than 50% by weight, preferably not more than 30% by weight.

The diol used in the invention is a diol having 10 to 40 carbon atoms, preferably 12 to 30 carbon atoms. If the number of carbon atoms of the diol is less than 10, the resulting polyisocyanate containing an isocyaurate ring is difficult to dissolve in the nonpolar organic solvent. On the other hand, the use of diols having more than 40 carbon atoms undesirably reduces the content of the isocyanate groups in the resulting polyisocyanates. The diols having 10 to 40 carbon atoms used in the invention are usually diols having an alkylene or cycloalkylene chain which may contain a substituent such as a hydrocarbon group.

As a matter of course, the use of a certain monohydric alcohol, such as a long-chain alcohol having an equivalent chain length in place of the long-chain diols having 10 to 40 carbon atoms reduces the functionality of the resulting polyisocyanate having an isocyanurate ring, and undesirably impairs the properties of the polyurethane resin. The use of trihydric or higher alcohols having a high functionality is neither desirable because it excessively increases the functionality of the polyisocyanate, increases the viscosity or markedly reduces the solubility in the nonpolar organic solvent. The use of a small amount of a monoalcohol or triol together with the diol defined in this invention is permisssible so long as it does not markedly impair the properties of the polyisocyanate used in the invention.

In the production of the polyisocyanate (B) having an isocyanurate ring, the diol is used in an amount of 1 to 40% by weight, preferably 2 to 30% by weight, based on the total amount of the diisocyanates charged.

The isocyanuration catalyst that can be used in this invention is a compound having a low electron density and containing strongly cationic atoms (atomic groupings). Examples include N,N,N-trimethyl-N-2-hydroxypropyl ammonium p-tertiary butylbenzoate represented by the following formula

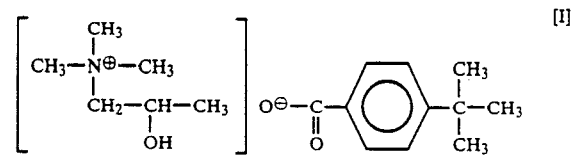

[I]

sodium ethylate and sodium propionate. The N,N,N-trimethyl-N-2-hydroxypropyl ammonium p-tertiary butylbenzoate is a particularly suitable catalyst for preparation of the polyisocyanate (B) because it is easy to purify.

Usually, the suitable amount of the isocyanurating catalyst is in the range of 10 to 1000 ppm, preferably 20 to 500 ppm, as a diluted solution in an organic solvent.

The isocyanurating reaction for obtaining the polyisocyanate (B) is usually carried out at a temperature of 30° to 120° C., preferably 40° to 100° C., at a conversion in the range of 20 to 70% by weight, preferably 30 to 65% by weight, based on the total amount of the diisocyanate compound and the diol charged. When the conversion exceeds 70% by weight, the resulting polyisocyanate undesirably has an excessively high molecular weight and decreases in solubility.

The final polyisocyanate (B) is obtained, for example, by treating the reaction mixture after the reaction with such a compound as phosphoric acid, monochloroacetic acid or dodecylbenzenesulfonic acid to deactivate the catalyst contained in it and then subjecting the residue to molecular distillation to remove the unreacted diisocyanate compound.

The polyisocyanate (B) so obtained is mixed with the nonpolar organic solvent in a weight ratio of from 10:90 to 90:10 to form a solution. The polymer (A) is added to the solution so that the ratio of the copolymer (A) to the polyisocyanate (B), in terms of the equivalent ratio of OH to NCO, is from 1:0.2 to 1:1.5, preferably from 1:0.5 to 1:1.4, more preferably from 1:0.7 to 1:1.3.

The nonpolar petroleum hydrocarbon organic solvent (C) is a nonpolar petroleum hydrocarbon having an aniline point of from 7° to 70° C., preferably 12° to 65° C., and a relatively weak dissolving power. Typical examples of the nonpolar solvent (C) are so-called petroleum hydrocarbon organic solvents, such as "Haws" (made by Shell Chemical Co.; aniline point 15° C.), "Swasol 310" (made by Maruzen Oil Co.; aniline point 16° C.), "Esso Naphtha No. 6" (made by Exxon Chemical Co.; aniline point 43° C.), "Laws" (made by Shell Chemical Co.; aniline point 44° C.), "Esso Naphtha No. 5" (made by Exxon Chemical; aniline point 55° C.) and "Pegasol 3040" (made by Mobil Oil Co.; aniline point 55° C.); methylcyclohexane (aniline point 40° C.); and ethylcyclohexane (aniline point 44° C.).

When the paint resin composition of this invention is recoated on a material which is susceptible to an attack of polar solvents and on which a coated film has already been applied in automobile repair coating or exterior finishing coating of buildings, no lifting (wrinkling) seen at the time of applying a paint containing a polar solvent occurs, and a smooth good paint film having a high commercial value can be formed. Furthermore, the application of the paint resin composition in accordance with this invention can circumvent the occurrence of solvent cracks which are observed when a paint containing a polar solvent is applied to a plastic substrate having inferior solvent resistance, such as polycarbonate. If the nonpolar organic solvent (c) is one which is photochemically inactive and has low toxicity, the working environment can be markedly improved over the case of using highly toxic polar solvents.

The paint resin composition of this invention can be cured by room temperature drying or forced drying. Needless to say, paint additives usually known in the art, such as pigment dispersants, levelling agents, ultraviolet absorbers and curing promoters, may be added to the composition of this invention. The paint resin composition of this invention may also contain plasticizers and other resins and copolymers, etc. to improve properties if they are soluble in the composition. The paint resin composition of this invention may be used as an enamel in admixture with a pigment, or as a clear paint without addition of a pigment. It may be coated by known methods using a sprayer or a roller.

In a special embodiment, the polyisocyanate (B) is dissolved in a polar solvent and/or an aromatic hydrocarbon solvent such as toluene or xylene, and separately a solution of the copolymer (A) in the nonpolar solvent (c) is prepared. Just prior to use, the two solutions may be mixed. If the polyester having a copolymerizable unsaturated bond is not modified with an oil and/or a fatty acid and has high polarity, the resulting composition does not become clear unless a small amount of a polar solvent exists together. In this case, a resin solution containing the nonpolar organic solvent and/or the aromatic hydrocarbon solvent and a minimum required amount of a polar solvent must be used as a raw material. This embodiment is also included within the paint resin composition provided by this invention.

The amount of the polar organic solvent and/or the aromatic hydrocarbon solvent such as toluene or xylene should be limited to not more than 35%, preferably not more than 20% by weight, based on the total amount of the organic solvent in order not to impair the effect of the invention as much as possible.

The aforesaid polar organic solvent is usually called a "polar solvent", and includes, for example esters such as ethyl acetate and butyl acetate, ketones such as methyl ethyl ketone and methyl isobutyl ketone and ether esters such as butyl Cellosolve acetate. The aforesaid aromatic hydrocarbon solvent includes low-molecular-weight aromatic solvents such as xylene.

The following examples illustrate the present invention specifically.

PRODUCTION EXAMPLE 1

Synthesis of a polyisocyanate (B):

A 5-liter four-necked glass flask equipped with a stirrer, a nitrogen gas introducing tube, an air cooling tube and a thermometer was charged with 3,500 g of "Desmodur H" (hexamethylene diisocyanate produced by Bayer AG) and 716.3 g of "Loxanol" (12-hydroxystearyl alcohol produced by Henkel AG; purity about 80%).

The flask was then fitted with an oil bath, and with stirring, the temperature was raised to 65° C. The contents of the flask became a clear solution. Subsequently, it was maintained at the same temperature for 2 hours and then the temperature was lowered to 55° C.

As an isocyanuration catalyst, 3.4 g of a 20% butyl Cellosolve solution of N,N,N-trimethyl-N-2-hydroxypropyl ammonium p-tertiary butylbenzoate (formula [I] given hereinabove) was added in portions. The mixture was subsequently reacted at 60° C. for 3 hours. Then, 3.4 g of a 7% xylene solution of monochloroacetic acid was added to deactivate the isocyanuration catalyst and thus to terminate the isocyanuration reaction.

The reaction mixture was cooled to room temperature, and a 1000 g aliquot of it was subjected to molecular distillation to give 549.4 g (conversion 55.0%) of a polyisocyanate containing an isocyanurate ring as a distillation residue and 450.0 g (recovery ratio 45.0%) of hexamethylene diisocyanate as a distillate.

The resulting polyisocyanate containing an isocyanurate ring was diluted with "Haws" (nonpolar solvent) to a concentration of 75% to give 732.2 g of a clear polyisocyanate solution (the desired resin composition of the invention).

The resulting polyisocyanate solution had a nonvolatile content of 75.1%, a Gardner color number of less than 1, a Gardner viscosity of E-F, an isocyanate content of 11.2% and a molecular weight of 953. The ratio of its dilution with the diluting solvent "Haws" (a petroleum hydrocarbon organic solvent; aniline point 15° C.) was more than 1,000%.

The resulting polyisocyanate is referred to as the polyisocyanate (B-1).

PRODUCTION EXAMPLE 2

Synthesis of a polyisocyanate (B):

The same isocyanuration reaction as in Production Example 1 was carried out except that 3,290 g of hexamethylene diisocyanate and 210 g of "Takenate 500" (xylylene diisocyanate produced by Takeda Chemical Industry Co., Ltd.) were used instead of 3,500 g of hexamethylene diisocyanate, and the amount of the isocyanuration catalyst used in production Example 1 was changed to 4.7 g. There was obtained 4,219 g of the reaction mixture containing the deactivated catalyst.

A 1,003 g aliquot of the reaction mixture was subjected to molecular distillation to give 522 g (conversion 52.1%) of a polyisocyanate containing an isocyanurate ring as a distillation residue and 480 g (recovery ratio 47.9%) of a distillate. Analysis showed the distillate to be substantially pure hexamethylene diisocyanate.

The resulting polyisocyanate was diluted to a concentration of 75% with "Haws" to give 696 g of a clear polyisocyanate solution (the desired resin composition of this invention).

The polyisocyanate solution had a nonvolatile content of 75.0%, a Gardner color number of less than 1, a Gardner viscosity of G-H, an isocyanate content of 10.3% and a molecular weight of 1,010. The ratio of dilution of the polyisocyanate with "Haws" was more than 1,000%.

The resulting polyisocyanate is referred to as the polyisocyanate (B-2).

PRODUCTION EXAMPLE 3

Synthesis of a polyisocyanate (B):

The same isocyanuration reaction as in Production Example 1 was carried out except that 2,100 g of hexamethylene diisocyanate and 1,400 g of 1,3-bis-(isocyanatomethyl)-cyclohexane (Takenate 600) were used instead of 3,500 g of hexamethylene diisocyanate, and the amount of the isocyanuration catalyst solution was changed to 3.9 g. There was obtained 4,215 g of the reaction mixture containing the deactivated catalyst.

A 1,001 g aliquot of the reaction mixture was subjected to molecular distillation to give 541.7 g (conversion 54.2%) of a polyisocyanate containing an isocyanurate ring as a distillation residue and 457.8 g (recovery ratio 45.8%) of a distillate.

The resulting polyisocyanate was diluted to a concentration of 75% with "Laws" (a nonpolar petroleum hydrocarbon organic solvent; aniline point 44° C.) to give 722.3 g of a clear polyisocyanate solution (the desired resin composition of this invention).

The polyisocyanate solution had a nonvolatile content of 75.1%, a Gardner color number of less than 1, a Gardner viscosity of F-G, an isocyanate content of 10.7% and a molecular weight of 292. The ratio of dilution of the polyisocyanate with "Haws" was more than 1,000%.

The resulting polyisocyanate is referred to as the polyisocyanate (B-3).

PRODUCTION EXAMPLE 4

Synthesis of a polyester resin containing an unsaturated bond (a-3):

A four-necked flask equipped with a stirrer, a thermometer, a nitrogen gas introducing tube and a device for removing water formed by the reaction was charged with 513 parts of isophthalic acid, 19 parts of maleic anhydride, 106 parts of adipic acid, 391 parts of neopentyl glycol, 83 parts of trimethylolpropane, 30 parts of pentaerythritol and 0.005 part of a defoamer, and the materials were heated to 180° C. The mixture was maintained at this temperature for 2 hours. Then, the temperature was raised to 220° C. over 3 hours, and the reaction mixture was maintained at this temperature in a nitrogen gas atmosphere until its acid value reaches 9 or below.

The reaction mixture was then diluted with toluene/ethyl acetate (95/5 by weight) to a nonvolatile content of about 60% to give a polyester resin (a-3-1) containing an unsaturated bond having a nonvolatile content of 60%, a viscosity of V, an acid value of 5.0 and a OH value of 72.

PRODUCTION EXAMPLE 5

Synthesis of a polyester resin (a-3) containing an unsaturated bond:

Production Example 4 was repeated except that 382 parts of dehydrated castor oil fatty acid, 5 parts of maleic anhydride, 349 parts of phthalic anhydride, 134 parts of neopentyl glycol, 98 parts of trimethylolpropane, 100 parts of pentaertythritol and 0.005 part of a defoamer were charged into the flask, and "Swasol 310" was used as the solvent. There was obtained a polyester resin (a-3-2) containing an unsaturated bond having a nonvolatile content of 60%, a viscosity of U, an acid value of 3.6 and a OH value of 54 and modified with dehydrated castor oil having an oil length of 40%.

PRODUCTION EXAMPLE 6

Synthesis of a copolymer (A):

A four-necked flask equipped with a stirrer, a thermometer and an inert gas introducing inlet was charged with 700 parts of "Haws", and the temperature was elevated to 120° C. A mixture composed of 150 parts of styrene, 8 parts of methacrylic acid, 21 parts of methyl methacrylate, 140 parts of 2-hydroxyethyl methacrylate, 200 parts of n-butyl methacrylate, 481 parts of b-butyl acrylate, 300 parts of "Haws", 10 parts of t-butyl perbenzoate, 5 parts of di-tertiary butyl proxide and 30 parts of t-butyl peroctoate was added dropwise over 4 hours at 120° C. After the addition, the mixture was maintained at 120° C. for about 15 hours.

There was obtained a copolymer (A-1) having a nonvolatile content of 50%, a viscosity of X, an acid value of 3.0, a OH value of 30 and a Tg of $-10°$ C.

PRODUCTION EXAMPLE 7

Synthesis of a copolymer (A):

Production Example 6 was repeated except that the four-necked flask was charged with 250 parts of the polyester resin (a-3-1) containing an unsaturated bond and 600 parts of "Swasol 310"; 120 parts of 2-hydroxyethyl acrylate, 10 parts of acrylic acid, 170 parts of methyl methacrylate, 200 parts of 2-ethylhexyl methacrylate, 100 parts of t-butyl methacrylate, 245 parts of butyl acrylate and 5 parts of N-i-propyl perfluorooctane sulfonamidoethyl acrylate were used as vinyl monomers; and 300 parts of "Haws" was used as an additional solvent.

There was obtained a copolymer (A-2) having a nonvolatile content of 50%, a viscosity of Z, an acid value of 4.5, a OH value of 38 and a Tg of 25° C.

PRODUCTION EXAMPLE 8

Synthesis of a copolymer (A):

Production Example 6 was repeated except that the four-necked flask was charged with 333 parts of the polyester resin (a-3-1) containing an unsaturated bond, 500 parts of the polyester resin (a-3-2) containing an unsaturated bond, 2 parts of fumaric acid and 367 parts of "Haws"; 8 parts of methacrylic acid, 100 parts of styrene, 190 parts of n-butyl methacrylate, 100 parts of i-butyl methacrylate and 100 parts of t-butyl methacrylate were used as vinyl monomers; 300 parts of "Swasol 310" was used as an additional solvent; and 15 parts of t-butyl perbenzoate, 10 parts of di-tertiary butyl peroxide and 35 parts of t-butyl peroctoate were used as polymerization initiators. There was obtained a copolymer (A-3) having a nonvolatile content of 50%, a viscosity of Y, an acid value of 4.8, a OH value of 28, and a Tg of 30° C.

PRODUCTION EXAMPLE 9

Synthesis of a copolymer (A):

Production Example 6 was repeated except that the four-necked flask was charged with 700 parts of "Swasol 310"; 100 parts of 2-hydroxyethyl methacrylate, 50 parts of 2-hydroxyethyl acrylate, 20 parts of methacrylic acid, 230 parts of methyl methacrylate, 200 parts of n-butyl methacrylate, 200 parts of i-butyl methacrylate and 200 parts of 2-ethylhexyl acrylate were used as vinyl monomers; and 300 parts of "Swasol 310" was used as an additional solvent.

There was obtained a copolymer (A-4) having a nonvolatile content of 50%, a viscosity of $Z_1$, an acid value of 6.5, a OH value of 34 and a Tg of 18° C.

PRODUCTION EXAMPLE 10

Synthesis of a copolymer (A):

Production Example 6 was repeated except that the four-necked flask was charged with 1083 parts of the polyester resin (a-3-2) containing an unsaturated bond and 267 parts of "Laws"; 100 parts of ethyl methacrylate, 200 parts of n-butyl methacrylate and 50 parts of 2-ethylhexyl methacrylate were used as vinyl monomers; 300 parts of "Laws" was used as an additional solvent; and 15 parts of t-butyl perbenzoate, 5 parts of di-tertiary butyl peroxide and 20 parts of t-butyl peroctoate were used as polymerization initiators.

There was obtained a copolymer (A-5) having a nonvolatile content of 50%, a viscosity of W, an acid value of 2.0, a OH value of 30 and a Tg of 8° C.

PRODUCTION EXAMPLE 11

Synthesis of a copolymer (A):

Production Example 6 was repeated except that the four-necked flask was charged with 300 parts of Cardula E-10 (glycidyl ester of a branched synthetic aliphatic carboxylic acid having 10 carbon atoms in the alkyl moiety), 667 parts of the polyester resin (a-3-2) containing an unsaturated bond and 433 parts of "Laws"; 100 parts of methacrylic acid, 100 parts of n-butyl methacrylate, 34 parts of 2-hydroxyethyl acrylate and 66 parts of isobutyl acryla were used as vinyl monomers; 300 parts of "Haws" was used as an additional solvent; 30 parts of t-butyl peroctoate, 10 parts of t-butyl perbenzoate and 5 parts of di-tertiary butyl peroxide were used as polymerization initiator; and 2 parts of boron trifluoride ethyl etherate was added in about 2 hours after the end of the addition of the monomeic mixture, the additional solvent and the polymerization initiators.

There was obtained a copolymer (A-6) having a nonvolatile content of 50%, a viscosity of Y-Z, an acid value of 3.5, a OH value of 60.

TEST EXAMPLE

Paints were prepared by pigmenting the copolymers (A-1) to (A-6) for 60 minutes by a sandmill in accordance with the recipes shown in Table 1 to obtain an enamel base, subsequently by adding polyisocyanates (B-1) to (B-3) to the enamel base.

The paints were diluted such that consistency becomes 12 to 13 seconds by a Ford cup #4 using a thinner composed of "Haws", xylene and "Laws" in a ratio of 50:20:30.

The paints were spray-coated and cured at room temperature for 2 weeks. The properties of the resulting coated films were evaluated, and the results are shown in Table 2.

TABLE 1

| Paint formulation (parts) | Example | | | | | | Comparative Example | | | |
|---|---|---|---|---|---|---|---|---|---|---|
| | 1 | 2 | 3 | 4 | 5 | 6 | 1 | 2 | 3 | 4 |
| components | | | | | | | | | | |
| Copolymer (A-1) solution | 100 | | | | | | | | | |
| Copolymer (A-2) solution | | 100 | | | | | | | | |
| Copolymer (A-3) solution | | | 100 | | | | | | | |
| Copolymer (A-4) solution | | | | 100 | | | | | | |
| Copolymer (A-5) solution | | | | | 100 | | | | | |
| Copolymer (A-6) solution | | | | | | 100 | | | | |
| "Acrydic 52-614" (*2) | | | | | | | 100 | | 100 | |
| "Acrydic A-801-P" (*2) | | | | | | | | 100 | | 100 |
| Typaque CR-93 | 35 | 38 | | 36 | 35 | 44 | 31 | 39 | 32 | 40 |
| Thinner (*1) | 30 | 30 | 30 | 30 | 30 | 30 | 30 | 30 | 30 | 30 |
| "Tinuvin 328" | | | 1 | | | 2 | | | | |
| "Tinuvin 770" | | | 1 | | | 2 | | | | |
| Curing agent | | | | | | | | | | |
| Polyisocyanate (B-1) | 20 | | | 23 | | | | | 12 | 133 |
| Polyisocyanate (B-2) | | 27.6 | 9.5 | | 22 | | | | | |
| Polyisocyanate (B-3) | | | 9.5 | | | 42 | | | | |
| "Burnock DN-950" | | | | | | | 10.5 | 30 | | |

(*1): The thinner was the same diluting thinner to provide a coating viscosity.
(*2): "Acrydic 52-614" (an acrylic polyol of Dainippon Ink & Chemicals, Inc., nonvolatile content 50%, OH value 17.5, solvent xylene/butyl acetate) "Acrydic A-801-p" (an acrylic polyol of Dainippon Ink & Chemicals, Inc., nonvolatile content 50%, OH value 50, solvent toluene/butyl acetate)
(i): In Examples 1 to 6, a solvent composed of "Haws"/xylene/"Laws" (=50/20/30) was used.
(ii): In Comparative Examples 1 to 4, a solvent composed of xylene/butyl acetate (=50/50) was used.

TABLE 2

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Gloss | 60° gloss | 92 | 91 | — | 91 | 93 | 93 | 91 | 95 | 92 | 94 |
| Hardness | Pencil, scratching | F | 2H | H | H | H | 2H | F | F | H | H |
| Lifting (by the method described below) | Case (A) | no change | | | | | | much lifting | | considerable lifting | |
| | Case (B) | no change | | | | | | much lifting | | considerable lifting | |
| | Case (C) | no change | | | | | | much lifting | | considerable lifting | |
| Effect of the solvent in the paint on the substrate | Polycarbonate | no change | | | | | | marked solvent crack | | considerable solvent crack | |
| | ABS | no change | | | | | | marked solvent crack | | considerable solvent crack | |
| | Polyphenylene oxide | no change | | | | | | marked solvent crack, | | considerable solvent crack, | |

TABLE 2-continued

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Weather-ability | Outdoor exposure for one year at the outskirts of Miyazaki City, Japan (gloss retention) | 88% | 90% | — | 89% | 92% | 94% | plus yellowing 78% | 86% | plus yellowing 85% | 91% |

Lifting was evaluated in the following three cases.

Case (A)

The structure of a coated film is as follows:
Top coat: a new repair coated layer
Primer: a lacquer-type primer surfacer layer
Old coated film: a crosslinked old coated layer (a urethane, a heat-cured acrylic, a heat-cured polyester, etc.
Substrate: a steel sheet
Method of forming the coated film is as follows:
The lacquer-type primer surfacer is coated on the old film and dried forcibly at 60° C. for 40 minutes. One day later, the surfacer layer is polished with #400 waterproof paper and then degreased. The repair film layer is then top-coated on the surfacer layer.
The part at which lifting occurs is the surfacer layer.

Case (B)

The structure of a coated film is as follows:
Top coat: a new repair coated layer
Primer: a crosslinked primer surfacer layer
Old coated film: a lacquer-type old coated layer (a NC lacquer-modified acrylic lacquer, a straight acrylic lacquer, a high solids lacquer, etc.)
Substrate: a steel sheet
Method of forming the coated film is as follows:
The crosslinkable primer surfacer is coated on the old film and dried forcibly at 60° C. for 40 minutes. One day later, the surfacer layer is polished with #400 waterproof paper and then degreased. The repair film layer is then top-coated on the surfacer layer.
The part at which lifting occurs is the lacquer-type old coated film layer.

Case (C)

Top coats: Second top coat layer and first top coat layer
Primer: Mastic paint layer having the recipe shown in Table 3.
Substrate: slate plate
Method of forming the coated film is as follows:
The first top coat is applied on the surface of the mastic paint layer and left to stand for about 60 hours at 30° C., and then the second top coat is applied.
The part at which lifting occurs is the first top coat layer.

TABLE 3

| Recipe of the mastic paint | |
|---|---|
| Calcium carbonate | 144 parts |
| Titanium oxide | 1.5 |
| Pigment dispersant | 3 |
| Nonionic surface-active agent | 1.5 |
| Ethylene glycol | 3 |
| Defoamer | 1.5 |
| 28% Aqueous ammonia | 1.0 |
| Water | 24 |
| 2% Methyl cellulose (thickener) | 18.6 |
| "Voncoat 3650" (an acrylic polyol of Dainippon Ink and Chemicals Inc.) | 104.6 |
| Pulp floc (thickener) | 1.1 |

What is claimed is:

1. A paint resin composition which does not appreciably attack an old coated film or a substrate to be coated, said composition consisting essentially of
   (A) a copolymer having a glass transition point of from −30° C. to +50° C., a number average molecular weight of from 4,000 to 20,000 and a weight average molecular weight/number average molecular weight ratio of from 1.8 to 10 and obtained by copolymerizing (a-1) to 50% by weight of a vinyl monomer having a hydroxyl group, (a-2) 0 to 5% by weight of a vinyl monomer having a carboxyl group, (a-3) 0 to 80% by weight of a polyester resin having a copolymerizable unsaturated bond, (a-4) 10 to 80% by weight of a vinyl monomer having a side-chain alkyl group with 4 to 8 carbon atoms, and (a-5) 4 to 49% by weight of another vinyl monomer other than the monomers (a-1), (a-2), (a-3) and (a-4) and being copolymerizable with the monomers (a-1) to (a-4), the total proportion of these monomers being 100% by weight, in the presence of a radical initiator in a nonpolar petroleum hydrocarbon organic solvent having an aniline point of 7° to 70° C.,
   (B) a polyisocyanate containing an isocyanurate ring and being soluble in a nonpolar petroleum hydrocarbon organic solvent having an aniline point of from 7° to 70° C., said polyisocyanate being obtained by reacting at least one diisocyanate compound selected from alkylene diisocyanates having 2 to 8 carbon atoms in the alkylene moiety, cycloalkylene diisocyanates having 6 to 8 carbon atoms in the cycloalkylene moiety and aralkylene diisocyanates having 7 to 8 carbon atoms in the aralkylene moiety with a diol having 10 to 40 carbon atoms, and
   (C) a nonpolar petroleum hydrocarbon organic solvent having an aniline point of from 7° to 70° C., the OH/NCO equivalent ratio of the copolymer (A) to the polyisocyanate (B) being from 1:0.2 to 1:1.5.

2. The resin composition of claim 1 wherein the alkylene diisocyanate is hexamethylene diisocyanate.

3. The resin composition of claim 1 wherein the cycloalkylene diisocyanate is 1,3-bis(isocyanatomethyl)-cyclohexane.

4. The resin composition of claim 1 wherein the cycloalkylene diisocyanate is 1,4-bis(isocyanatomethyl)-cyclohexane.